(12) United States Patent
Yang

(10) Patent No.: US 9,835,841 B2
(45) Date of Patent: Dec. 5, 2017

(54) 3D VIDEO MICROSCOPY SYSTEM

(71) Applicants: SOMETECH CO., LTD, Seoul (KR);
Hee Bong Yang, Namyangju-si (KR)

(72) Inventor: Hee Bong Yang, Namyangju-si (KR)

(73) Assignee: SOMETECH CO., LTD, Seoul (KR)

(*) Notice: Subject to any disclaimer, the term of this patent is extended or adjusted under 35 U.S.C. 154(b) by 0 days.

(21) Appl. No.: 14/785,097

(22) PCT Filed: Apr. 18, 2014

(86) PCT No.: PCT/KR2014/003382
§ 371 (c)(1),
(2) Date: Oct. 16, 2015

(87) PCT Pub. No.: WO2015/156442
PCT Pub. Date: Oct. 15, 2015

(65) Prior Publication Data
US 2017/0045727 A1 Feb. 16, 2017

(30) Foreign Application Priority Data
Apr. 7, 2014 (KR) .................. 10-2014-0041445

(51) Int. Cl.
*G02B 15/02* (2006.01)
*G02B 21/36* (2006.01)
(Continued)

(52) U.S. Cl.
CPC ............. *G02B 21/361* (2013.01); *G02B 5/04* (2013.01); *G02B 15/02* (2013.01);
(Continued)

(58) Field of Classification Search
CPC ........ A61F 2210/0014; A61F 2240/001; A61F 2/91; A61F 2/915; A61L 31/022;
(Continued)

(56) References Cited

U.S. PATENT DOCUMENTS 4,178,090 A * 12/1979 Marks .................... G03B 35/10
352/60
4,523,226 A 6/1985 Lipton et al.
(Continued)

FOREIGN PATENT DOCUMENTS

JP 2000338416 12/2000
JP 2005157335 6/2005
(Continued)

OTHER PUBLICATIONS

LaRosa et al, Experiments with three-dimensional optical microscopy using axially distributed sensing, 2012.*
(Continued)

*Primary Examiner* — Shan Elahi
(74) *Attorney, Agent, or Firm* — Cantor Colburn LLP

(57) ABSTRACT

A video microscopy system for displaying a 3D image on a monitor by magnifying a portion that is not easily visually observed or a portion that is generally out of visual reach. The 3D image is displayed on the monitor such that the object can be more realistically observed. The 3D video microscopy system can display the object flat without distortion by focusing the image using an achromatic prism, clearly display the object by removing chromatic aberration, and adjust the convergence angle and the degree of magnification of the object in a simple manner. The 3D video microscopy system includes a pair of image sensors, an achromatic prism focusing an image of an object on the image sensors by removing chromatic aberration thereof, and a pair of magnifying lenses transferring the image of the object that has passed through the achromatic prism to the image sensors by a predetermined ratio.

2 Claims, 2 Drawing Sheets

(51) Int. Cl.
*G02B 21/00* (2006.01)
*G02B 5/04* (2006.01)
*G02B 21/22* (2006.01)
*G02B 27/00* (2006.01)
*H04N 13/02* (2006.01)

(52) U.S. Cl.
CPC ......... *G02B 21/0012* (2013.01); *G02B 21/22* (2013.01); *G02B 27/0025* (2013.01); *H04N 13/0239* (2013.01); *H04N 2213/001* (2013.01)

(58) Field of Classification Search
CPC .. B23K 2203/14; B23K 26/08; B23K 26/146; B23K 26/38; B23K 26/40; C22C 19/007; C22C 19/07; C22F 1/10; G02B 15/02; G02B 21/0012; G02B 21/22; G02B 21/361
USPC .......................................................... 348/47
See application file for complete search history.

(56) References Cited

U.S. PATENT DOCUMENTS

| | | | |
|---|---|---|---|
| 6,546,208 B1 | 4/2003 | Costales | |
| 6,831,781 B2* | 12/2004 | Tearney | A61B 1/00096 359/368 |
| 8,531,581 B2* | 9/2013 | Shroff | H04N 5/23212 348/335 |
| 8,884,211 B2* | 11/2014 | Feng | G01N 21/6428 250/208.2 |
| 9,036,869 B2* | 5/2015 | Lee | G02B 21/0016 345/582 |
| 9,339,179 B2* | 5/2016 | Frison | A61B 3/1025 |
| 2011/0122416 A1* | 5/2011 | Yang | A61B 5/0059 356/457 |
| 2012/0056991 A1* | 3/2012 | Zund | H01L 27/14605 348/46 |
| 2012/0188347 A1* | 7/2012 | Mitchell | A61B 1/00193 348/50 |
| 2012/0204648 A1* | 8/2012 | Wang | A61B 5/0095 73/606 |
| 2013/0201552 A1* | 8/2013 | Sander | G02B 21/0076 359/385 |
| 2013/0293841 A1* | 11/2013 | Frison | A61B 3/1025 351/206 |
| 2014/0320601 A1* | 10/2014 | Cutrale | G02B 21/16 348/46 |

FOREIGN PATENT DOCUMENTS

| | | |
|---|---|---|
| JP | 2014021293 | 2/2014 |
| KR | 101092108 | 12/2011 |
| KR | 1020120138520 | 12/2012 |

OTHER PUBLICATIONS

Yoon et al, Implement of Stereo Image Correction for 3D Optical Microscope and Design Hardware System, 2016.*
International Search Report—PCT/KR2014/003382 dated Oct. 29, 2014.

* cited by examiner

3D VIDEO MICROSCOPY SYSTEM

TECHNICAL FIELD

The present invention generally relates to a video microscopy system for displaying a three-dimensional (3D) image on a monitor by magnifying a portion that is not easily visually observed or a portion that is generally out of visual reach such that the 3D image can be widely used in the healthcare industry including surgical operations and a variety of other industrial fields. More particularly, the present invention relates to 3D video microscopy system able to display a 3D image of an object (e.g. an affected part of a patient, a variety of mechanical apparatuses, a semiconductor device, or the like) on a monitor such that the object can be more realistically observed. The 3D video microscopy system can display the object flat without distortion by focusing the image of the object using an achromatic prism, clearly display the object by removing chromatic aberration, and adjust the convergence angle and the degree of magnification of the displayed object in a simple manner.

BACKGROUND ART

As is well known, a microscope is an instrument that produces magnified images of objects. In the past, an observer had to bring his or her eyes to an eyepiece in order to observe an object. Recently, along with the development of technologies, video microscopy systems are being commercially distributed. Such video microscopy systems display an object on a monitor such that an observer can magnify the object without restrictions in his/her actions (e.g. the observer needing to keep his/her eyes on an eyepiece).

Currently, the use of such video microscopy systems is increasing in the healthcare industry including surgical operations and a variety of other industrial fields.

Since a 3D video microscopy system according to the present invention is expected to be mainly used in the healthcare industry including surgical operations, the following disclosure will be given with respect to the healthcare industry. However, the 3D video microscopy system according to the present invention may be used in a variety of other industrial fields.

In general, a medical surgical microscope is a type of medical instrument used in the departments of surgery, ophthalmology, neurosurgery, otorhinolaryngology, spine surgery, and obstetrics and gynecology in medical institutions. The medical surgical microscope magnifies a body part that would otherwise not be easily seen or observed by a doctor, thereby helping the doctor to perform a surgical operation on the magnified body part.

Thus, the doctor can perform a surgical operation while observing the affected part of a patient photographed by the medical surgical microscope. In addition, assistants other than the doctor or patient guardians can observe the affected part of the patient and the proceeding of the surgical operation on a monitor in an operating room or outside the operating room.

In this case, images displayed on the monitor are merely displayed as two-dimensional (2D) images. It is therefore difficult to accurately observe and conceptualize the surgical part.

Thus, recently, three-dimensional (3D) image systems are being developed, whereby surgical proceedings are displayed as 3D images such that an affected part and the rear portion of the affected part can be observed during the surgical operation.

Some surgical microscopy systems of the related art were disclosed by Korean Patent Application Publication No. 10-2012-0138520 "SURGICAL MICROSCOPY SYSTEM," Korean Patent No. 10-1092108 "SURGICAL MICROSCOPY SYSTEM," and the like.

Referring to these disclosures, a surgical microscopy system includes an image sensor (e.g. a CCD sensor or a CMOS sensor) processing an image of an object focused thereon such that the image can be displayed on a monitor, a convex lens enabling the image of the object to be focused on the image sensor, and a magnification lens disposed between the convex lens and the image sensor to adjust the magnification of the image of the object.

As above, the surgical microscopy system of the related art uses the convex lens in order to focus the image of the object. However, due to the convex structure of the convex lens and the refracting property of the light of the image passing through the convex lens, the object is displayed as a distorted image on the monitor, i.e. the image is distorted outwards or inwards.

When a person observes the distorted image of the object displayed on the monitor, different from the original image, for a prolonged period, the distorted image may cause the person to become dizzy. This may have an adverse effect on a person performing a surgical operation. A complicated surgical operation may be hindered or a medical accident may occur.

Thus, it is strongly required not to cause dizziness even though a surgical operation is performed while a monitor is observed for a prolonged period. However, in the related art, this problem has not been yet overcome.

In the 3D image, when the parallax between the left image and the right image is not matched, the brain of a person observing the 3D image unconsciously matches the parallax of the image displayed, thereby causing dizziness and fatigue of the eyes. It is therefore important to adjust the parallax.

One of simple methods of adjusting the parallax is to adjust the distance between the object and a focusing lens within the microscope. The focusing lens focuses the object on the image sensor.

However, in the surgical microscopy system of the related art, the lens focusing the object on the image sensor is fixed, and thus it is difficult to adjust the convergence angle during the surgical operation.

DISCLOSURE

Technical Problem

Accordingly, the present invention has been made keeping in mind the above problems occurring in the surgical microscopy system of the related art, and the present invention is intended to propose a 3D video microscopy system able to display an object as a flat image without distortion (bending) on a monitor using a prism as a member focusing the image of the object on an image sensor instead of a convex lens, whereby a person can observe the monitor for a prolonged time without fatigue of eyes such that a surgical operation can be safely performed without a medical accident, and able to provide a high-quality object image using an achromatic prism configured as a double-layer structure of two prisms having different refractive indices.

Fixed-magnification lenses are selectively arranged on axes connecting magnification lenses and image sensors, such that the microscopy system can adjust the magnifying power thereof in a simple manner.

The achromatic prism is movable forwards and backwards, such that a convergence angle can be adjusted in a simple manner.

Technical Solution

In order to achieve the above object, according to one aspect of the present invention, a three-dimensional (3D) video microscopy system includes: a pair of image sensors; an achromatic prism focusing an image of an object on the image sensors by removing chromatic aberration thereof; and a pair of magnifying lenses transferring the image of the object that has passed through the achromatic prism to the image sensors by a predetermined ratio.

The 3D video microscopy system may further include fixed-magnification lenses selectively disposed on imaginary axes connecting the image sensors and the magnifying lenses, the fixed-magnification lenses adjusting a degree of magnification of the object focused on the image sensors.

The achromatic prism may move forwards and backwards to adjust a convergence angle.

Advantageous Effects

According to the present invention having the above-described configuration, the surgical 3D microscopy system can display an object on a monitor as a flat image without being distorted outwards or inwards using a prism instead of a convex lens in order to focus the image of the object on an image sensor, whereby a person can observe the monitor for a prolonged time without fatigue of eyes. The drawback of the prism having a significant degree of chromatic aberration is overcome using an achromatic prism without chromatic aberration, the achromatic prism having a double-layer structure of two prisms having different refractive indices. When the direction in which an affected part is observed through the microscopy system and the distance of the observation change, the convergence angle can be adjusted in a simple manner by moving the achromatic prism forwards and backwards. Consequently, a clear 3D image having high quality can be produced.

DESCRIPTION OF THE REFERENCE NUMERALS IN THE DRAWINGS

Figure 1:
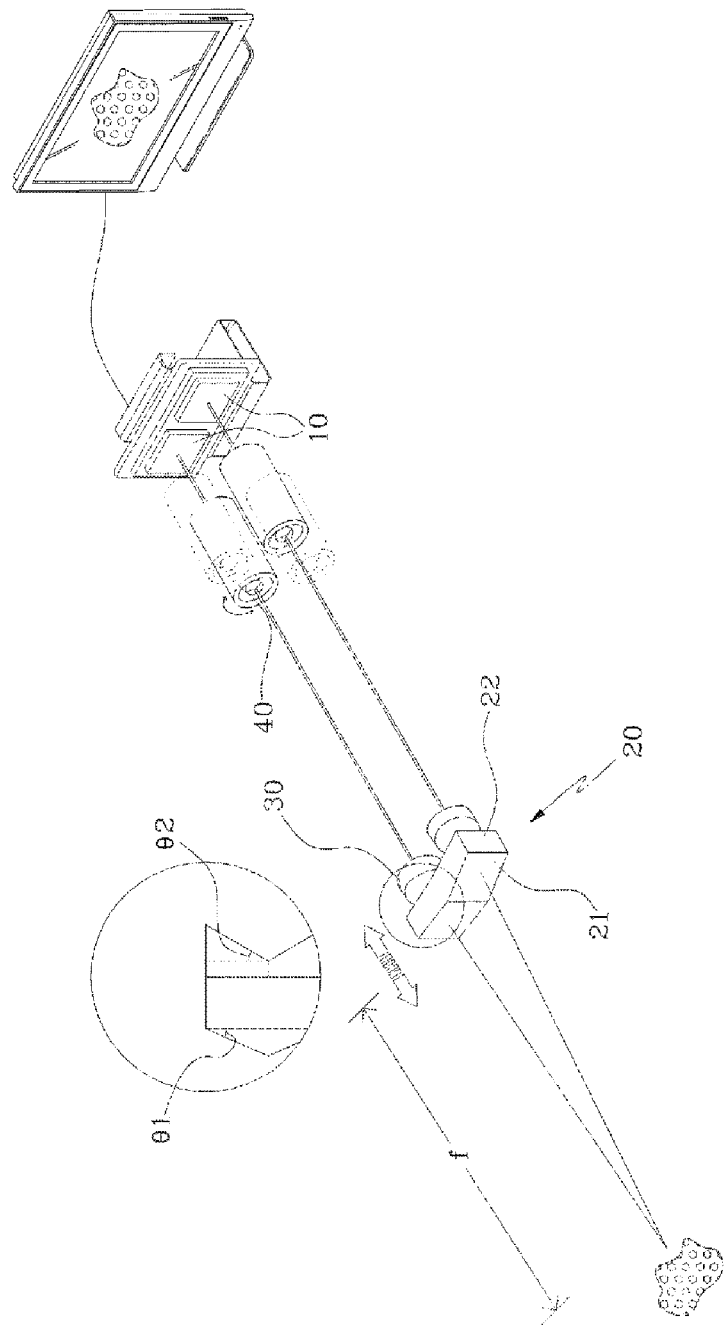
FIG. 1 is a perspective view illustrating key parts of a surgical 3D microscopy system according to the present invention.

10: image sensor
20: achromatic prism
30: magnification lens
40: fixed-magnification lens

BEST MODE

Reference will now be made in greater detail to a surgical 3D microscopy system according to the present invention with reference to the accompanying drawings.

The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, tens and units, or reference numerals having like tens, units and letters refer to like elements having like functions throughout, and unless the context clearly indicates otherwise, elements referred to by reference numerals of the drawings should be understood based on this standard.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

As illustrated in the drawings, the surgical 3D microscopy system according to the present invention includes image sensors 10, an achromatic prism 20, magnification lenses 30, and fixed-magnification lenses 40.

The image sensors 10 generate image data by processing an input image of an object (inputted in the form of light), and transmit the generated image data to a body. The body outputs the image data transmitted by the image sensors 10 to a monitor, which in turn displays the image.

Each of the image sensors 10 may be implemented as a CCD or a CMOS device. Since the present invention relates to a microscope providing 3D images, a pair of image sensors 10 are provided. The pair of image sensors 10 receive a left-eye image of the object (the affected part) viewed from the left and a right-eye image of the object (the affected part) viewed from the right and subsequently process the received left-eye and right-eye images.

The achromatic prism 20 transfers an input image of an object to the image sensors 10, which in turn process the image. In the related art, as described above, a convex lens is used as a focusing member in order to focus the image of the object on the image sensor 10. However, due to the convex features of the convex lens, the image of the object displayed on the monitor is distorted outwards (or inwards) differently from the original image. Looking at such an image for a prolonged period causes dizziness.

In contrast, the prism ensures that a flat image having the same shape as the original image is focused on the image sensors 10. Thus, when the image is displayed on the monitor, the problem of causing dizziness does not occur.

However, the prism has a greater degree of chromatic aberration than the convex lens, which is problematic. Specifically, the differences in the refractive indices of the prism according to the colors (wavelengths) of light containing the inputted image of the object are generally greater than those of a convex lens. Thus, the surroundings of the object displayed on the monitor are stained with rainbow colors.

In order to overcome the problem of chromatic aberration, the present invention removes chromatic aberration using the achromatic prism 20 including a first prism 21 and a second prism 22 stacked on each other.

In the achromatic prism 20, the rear surface of the first prism 21 and the front surface of the second prism 22 have a planar structure, such that the first prism 21 and the second prism 22 are in close contact with each other. The front surface of the first prism 21 has an angled structure with the central portion thereof protruding, such that the left image and the right image of an object can be separately inputted through the first prism 21. The rear surface of the second prism 22 has an angled structure with the central portion thereof being recessed, such that the left image and the right image of the object inputted through both sections of the front surface of the first prism 21 can be transferred to the pair of image sensors 10.

The materials of the first prism 21 and the second prism 22 depending on the refractive indices thereof, as well as the angles θ1 and θ2 of the first prism 21 and the second prism 22, are determined such that the achromatic prism 20 has a focal length f suitable for surgery operation and chromatic aberration is removed due to the realization of the focal length f.

In this case, it is preferable that the angles θ1 and θ2 are determined such that the microscopy system is miniaturized and the mounting of components on the interior of the microscopy system is facilitated in order to minimize the volume (in particular, the length in the front-rear direction) of the achromatic prism 20, and that the first and second prisms 21 and 22 are easily machined and are not easily damaged by forces applied thereon from external sources.

The focal length f of the achromatic prism 20 suitable for surgical operation ranges from 50 mm to 500 mm, more preferably, from 200 mm to 400 mm.

Considering the minimization of the volume, the ease of fabrication, endurance against forces applied thereto from external sources, the efficiency of the removal of chromatic aberration within the range of the focal length f, the angle θ1 of the first prism ranges from 5° to 40°, and more preferably, from 7° to 15°, and the angle θ2 of the second prism ranges from 3° to 10°, and more preferably, from 4° to 8°.

The achromatic prism 20 can move forwards and backwards, whereby the convergence angle of a 3D image can be adjusted.

In the 3D image, in response to changes in the direction in which the object is observed and the distance at which the object is observed, a parallax occurs between the left image and the right image. The parallax causes the outline of the object displayed on the monitor to be unclear. The observer becomes significantly tired observing the unfocused object.

Thus, when the parallax occurs between the right image and the left image due to the different directions or distances of an affected part in observing the affected part through a microscope during the surgical operation, it is required to minimize the parallax through simple manipulation. That is, it is required to adjust the parallax in a simple manner.

The present invention adjusts the convergence angle during the surgical operation in a simple manner by moving the achromatic prism 20 forwards and backwards using a forward-backward displacement means (not shown).

A pair of magnification lenses 30 are disposed on both sides downstream of the achromatic prism 20. The magnification lenses 30 magnify the images of the object that has passed through the achromatic prism 20 by predetermined magnifying power, and transfer the magnified images to the image sensors 10.

Several types of magnification lenses 30 are provided in different arrays. Thus, from time to time, a pair of magnification lenses 30 having an intended magnifying power is disposed downstream of the achromatic prism 20 in response to the manipulation of a user (a person performing a surgical operation).

The fixed-magnification lenses 40 are provided in a pair. The fixed-magnification lenses 40 are selectively disposed on imaginary axes connecting the magnification lenses 30 and the image sensors 10, thereby adjusting the magnification of the object focused on the image sensor 10.

Specifically, when the fixed-magnification lenses 40 are disposed on the imaginary axes connecting the magnification lenses 30 and the image sensors 10, the images of the object transferred from the magnification lenses 30 are magnified by predetermined degrees of magnification (e.g. 0.5 times or 2 times) before being transferred to the image sensors 10. When the fixed-magnification lenses 40 are offset from the imaginary axes connecting the magnification lenses 30 and the image sensors 10, the images of the object that has passed through the magnification lenses 30 are transferred to the image sensors 10 without being processed, whereby the images magnified at the degrees of magnification of the magnification lenses are focused on the image sensors 10 and are subsequently displayed on the monitor.

The fixed-magnification lenses 40 are rotated by a rotating means (not shown) to be disposed on the imaginary axes connecting the magnification lenses 30 and the image sensors 10 or become offset from the imaginary axes.

When the pair of fixed-magnification lenses 40 are provided as in the accompanying drawings, the fixed-magnification lenses 40 are disposed on the imaginary axes through rotation by an angle of 90° and are offset from the imaginary axes through reverse rotation by an angle of 90°.

When two or more pairs of fixed-magnification lenses 40 are provided, the degree of magnification can be adjusted more variously. Specifically, when two pairs of fixed-magnification lenses 40 having different magnifying powers are provided, a pair of fixed-magnification lenses 40, another pair of fixed-magnification lenses 40, and non-fixed-magnification lenses (no fixed-magnification lenses 40) are arranged at angular intervals of 60°, whereby the degree of magnification of the object can be adjusted whenever these magnification lenses are rotated at angles of 60° using a rotating means.

Hereinafter, the surgical 3D microscopy system according to the present invention as well as an image processing device processing an image taken by the surgical 3D microscopy system and outputting the processed image to a monitor will be described with reference to FIG. 2.

Images of an object 89 to be observed (photographed) are inputted through both sections of the achromatic prism 20. The achromatic prism 20 converts the optical passages of the images inputted through the both sections according to the wavelengths such that the chromatic aberration thereof is removed and the images are subsequently inputted into the pair of magnification lenses 30.

The achromatic prism 20 can move forwards and backwards, thereby mechanically adjusting the convergence angles of the images of the object (i.e. a left-eye image and a right-eye image) that are inputted into the both sections thereof.

The magnification lenses 30 magnify the images of the object transferred from the achromatic prism 20 by a predetermined degree of magnification. The fixed-magnification lenses 40 magnify (or reduce) the images of the object transferred from the magnification lenses 30 by a fixed ratio.

Focus lenses 92 disposed downstream of the fixed-magnification lenses 40 adjust the focuses of the images of the object by moving forwards and backwards along the optical passages within barrels 93.

The images of the object that have passed through the focus lenses 92 are inputted into and focused on the image sensors 10, which in turn convert optical data containing the input images of the object into image data.

The image data of the image sensors 10 is transmitted to converters 95, which in turn execute format conversion or the like such that the input image data can be easily pre-processed.

The image data, for example, the format of which is converted by the converters 95, is transmitted to a pre-processor 96, which in turn executes pre-processing on the image data by transforming the image data along space and time axes such that the image data can be memorized and processed.

The image data pre-processed by the pre-processor 96 is transmitted to an ISP section 97, which in turn adjusts the colors, brightness, and the like of the image.

The image data, for example, the colors and brightness of which are adjusted by the ISP section 97, is transmitted to a convergence angle-adjusting block 98, which in turn adjusts the convergence angle of the image data by adjusting the centers and the sensation of distance of the left-eye image data and the right-eye image data.

The left-eye and right-eye image data, the convergence angles of which are adjusted by the convergence angle-adjusting block 98, may be outputted to a monitor 104 having a multiplexing function through transmitters 101 and 102, such that the monitor 104 synthesizes the left-eye and right-eye image data, thereby displaying a 3D image. Alternatively, the left-eye and right-eye image data may be transmitted to a synthesizer 99 and may be subsequently transmitted to monitors 105 and 106, which in turn display a 3D image.

Here, the left-eye and right-eye image data, the convergence angles of which are adjusted by the convergence angle-adjusting block 98, may be transmitted to left and right monitors of a head mount display (HMD) device (e.g. a 3D glasses or a headset having monitors). In this manner, the left-eye image and the right-eye image may be displayed to be observed by the left eye and the right eye of a wearer, such that the wearer can see a 3D image.

Figure 2:
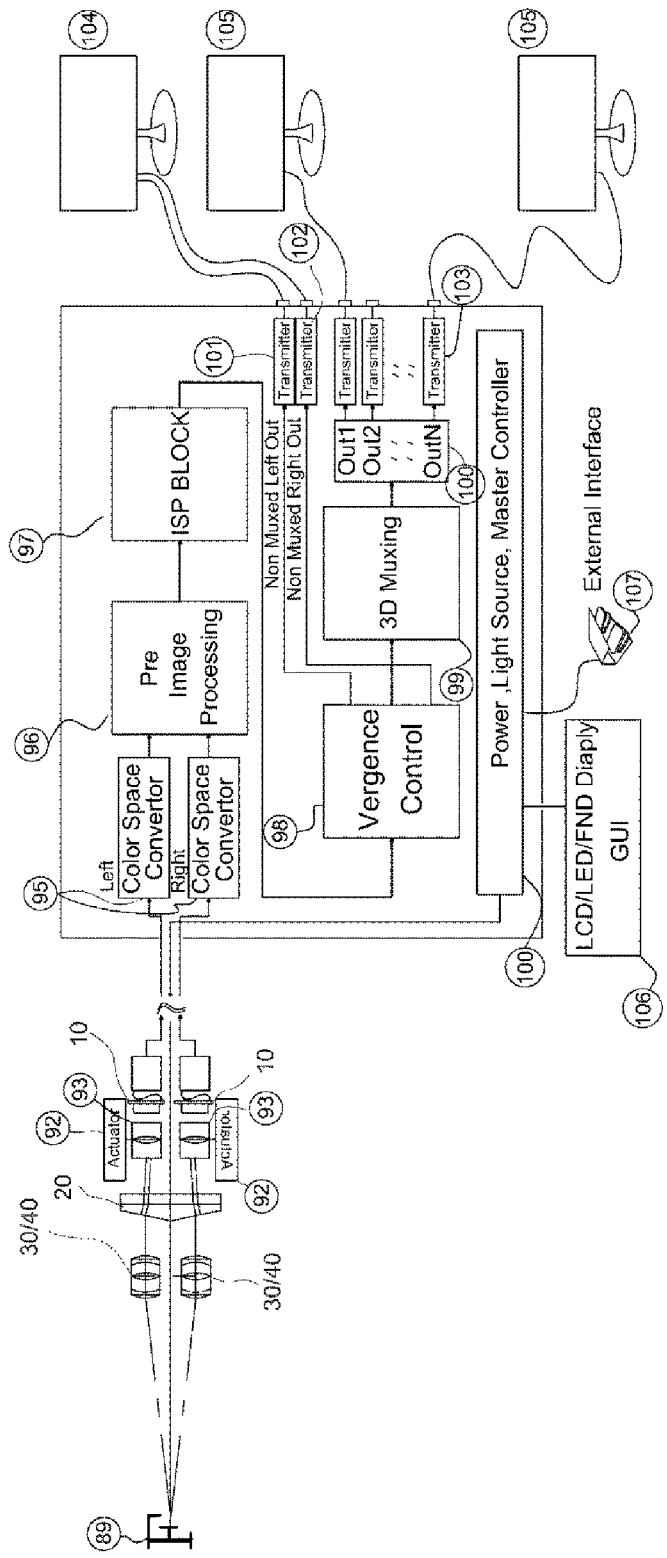
FIG. 2 is a block diagram illustrating the surgical 3D microscopy system according to the present invention as well as an image processing device processing an image taken by the surgical 3D microscopy system and outputting the processed image to a monitor.

In FIG. 2, reference numeral '107' that has not been described indicates a controller generally controlling the 3D video microscopy system and the image processing device using power management, light source control, command signal processing, or the like. Reference numeral '108' indicates a user interface, and reference numeral '109' indicates an external input device, such as a hand switch, a foot switch, or the like.

Although the present invention has been disclosed with respect to the 3D video microscopy system and the image processing device having the specific shape and structure with reference to the accompanying drawings, a person skilled in the art will appreciate that various modifications and alterations are possible, without departing from the scope and spirit of the invention.

The invention claimed is:

1. A three-dimensional video microscopy system comprising:
   a pair of image sensors, the image sensor including a left-eye image sensor and a right-eye image sensor;
   an achromatic prism focusing an image of an object on the image sensors by removing chromatic aberration thereof and transferring the image of the object to the image sensors, the image sensors processing the image of the object,
   wherein the achromatic prism consists of:
   a first prism, wherein a front surface of the first prism has an angled structure with a central portion thereof protruding such that a left image and a right image of the object are separately inputted therethrough; and
   a second prism coupled to and stacked on the first prism such that a front surface of the second prism is in close contact with a rear surface of the first prism, wherein a rear surface of the second prism has an angled structure with a central portion thereof being recessed, such that the left image and the right image of the object inputted through both sections of the front surface of the first prism are respectively transferred to the left eye image sensor and the right eye image sensor;
   a pair of magnifying lenses transferring the image of the object that has passed through the achromatic prism to the image sensors by a predetermined ratio; and
   a fixed-magnification lenses selectively disposed on an imaginary axis connecting the image sensors and the magnifying lenses, the fixed-magnification lenses adjusting a degree of magnification of the object focused on the image sensors,
   wherein the achromatic prism is configured to move forwards and backwards along the imaginary axis to adjust a convergence angle.

2. The three-dimensional video microscopy system according to claim 1,
   wherein a focal length (f) of the achromatic prism ranges from 200 mm to 400 mm, an angle ($\theta 1$) of the first prism ranges from 7° to 15°, and an angle ($\theta 2$) of the second prism ranges from 4° to 8°.

* * * * *